United States Patent [19]

Lord

[11] Patent Number: 5,010,494
[45] Date of Patent: Apr. 23, 1991

[54] METHOD AND APPARATUS FOR DETECTING MECHANICAL ROLL IMPERFECTIONS IN A ROLLER DRAFTING SYSTEM

[75] Inventor: Peter R. Lord, Raleigh, N.C.

[73] Assignee: North Carolina State University, Raleigh, N.C.

[21] Appl. No.: 242,752

[22] Filed: Sep. 9, 1988

[51] Int. Cl.$^5$ .................. G01N 27/82; B21B 37/00
[52] U.S. Cl. ................. 364/507; 364/471; 364/570; 340/675; 73/159; 19/239; 19/258
[58] Field of Search ............ 364/507, 550, 571.01, 364/571.02, 575, 471, 472, 570; 340/675; 73/159, 160; 19/236, 239, 240, 258, 260

[56] References Cited

U.S. PATENT DOCUMENTS

| | | | |
|---|---|---|---|
| 2,891,287 | 6/1959 | Raper | 19/70 |
| 2,905,976 | 1/1959 | Matthew et al. | 19/70 |
| 3,087,204 | 4/1963 | Catling | 19/240 |
| 3,088,175 | 5/1963 | Aoki | 19/240 |
| 3,305,688 | 2/1967 | Lamparter | 250/219 |
| 3,384,933 | 5/1968 | Yamamoto et al. | 19/65 |
| 3,444,594 | 5/1969 | Whitehurst | 19/239 |
| 3,822,590 | 7/1974 | Tharpe et al. | 73/160 |
| 4,100,649 | 7/1978 | Erismann et al. | 19/240 |
| 4,267,620 | 5/1981 | Allen, Jr. | 19/239 |
| 4,302,968 | 12/1981 | Moser | 73/160 |
| 4,473,924 | 10/1984 | Hartmannsgruber et al. | 19/239 |
| 4,495,587 | 1/1985 | Plante et al. | 364/507 |
| 4,496,056 | 1/1985 | Schoenig, Jr.; et al. | 364/507 |
| 4,506,414 | 3/1985 | Krieger | 19/240 |
| 4,521,859 | 6/1985 | Fapiano | 364/571.02 |
| 4,646,387 | 3/1987 | Oswald et al. | 19/240 |
| 4,653,153 | 3/1987 | Felix et al. | 19/240 |
| 4,776,192 | 10/1988 | Oda et al. | 364/472 |
| 4,805,492 | 2/1989 | Tsurdua | 364/472 |
| 4,819,181 | 4/1989 | Törnblum | 364/507 |

Primary Examiner—Parshotam S. Lall
Assistant Examiner—Brian M. Mattson
Attorney, Agent, or Firm—Bell, Seltzer, Park & Gibson

[57] ABSTRACT

A drawframe is disclosed which has a plurality of sets of draw rolls and includes a provision for the early detection of imperfections in rotating elements in the drawframe. The separation of the pairs of rolls is monitored, and a signal representative of that separation is generated. The resulting signal is then processed so that only intolerable errors remain, and the major harmonic elements of the remaining signal are correlated with the rotational frequencies of the rotating elements of the drafting or drawing apparatus. Establishment of synchronism between significant harmonic components in the signal representative of the separation of the cooperating pair of rolls and the rotational frequency of a rotating element in the apparatus makes it possible to identify any unacceptable mechanical cause of error while the machine is still running.

21 Claims, 8 Drawing Sheets

METHOD AND APPARATUS FOR DETECTING MECHANICAL ROLL IMPERFECTIONS IN A ROLLER DRAFTING SYSTEM

Field of the Invention

This invention relates to a method and apparatus for detecting imperfections in the drawing or drafting rolls of various machines in which material passes through successive sets of rolls and is elongated by having the successive sets of rolls moved at progressively higher surface speeds. An example of such a machine is a draw frame used in the textile industry. In this case, the textile strand is attenuated or "drafted" or "drawn" in such a way that the mass per unit length of the output strand is smaller than the mass per unit length of the total number of strands approaching the rolls on the input side. Mass per unit length is often referred to as "linear density".

Background of the Invention

The equivalent of roller drafting is used in many industries, but for the purposes of the present description, one particular industry will be selected and one particular type of product described, but the concept is equally valid over a wide range of products and industries. In the example, a textile strand is cited, but the idea could just as easily be applied to the production of sheet material, such as found in the steel industry.

Roller drafting is used in producing textile strands as part of the processes of drawing, roving, spinning and elsewhere in the production of filament and staple-fiber strands. As is well known in the art, two or more sets of rolls are used with each set containing two or more rolls pressed together to grip the textile strand passing between them. The rolls within a set rotate so as to give a common surface velocity, and the strand is advanced at that velocity or an approximation thereto. Successive sets of rolls along the line of flow move at increasing surface velocities with the result that the textile or other strand is elongated, and the process of continuous elongation is called either drawing or drafting according to the area where it is used. In textile materials, the purpose of drawing a filament strand is primarily to orient the molecular structure while in staple-yarn production, the purpose is to both orient the fibers and reduce the linear density of the strand.

During processing, errors occur in two different categories. The first category includes errors existing in the feed material as well as those produced by the irregular flow of material through the drafting or drawing system. These material-borne errors are random or have large random components. Some of these types of errors are referred to as "drafting waves" and for the present purpose all the errors in this category will be termed drafting waves. The second category contains errors produced by imperfections in the rolls and drive trains. These are termed "mechanical errors". For example, a 2 inch diameter roll with 0.001 inch eccentricity has a surface velocity which varies by ±0.1%. The change in surface velocity of one roll set with respect to the others in another set can cause a similar percentage change in the output linear density. Also, the eccentricity causes the position of the nip of the rolls in a set containing the bad roll to move in relation to the nip in adjacent sets. This too produces a mechanical error. Mechanical errors at the point of production are repetitive and may be represented as a series of sinusoidal variations of different harmonic frequencies, and may be subject to harmonic analysis.

Traditional methods of detecting errors have included the sampling of strands, the testing of them in the laboratory, the analysis of the results by experts, and, if mechanical errors are diagnosed, correction of the machine fault. This is a lengthy process during which large quantities of faulty material are produced during the interim. Furthermore, diagnosis requires experts because it is frequently difficult to discriminate between small mechanical errors amid those caused by the irregular flow of the material. The mechanical faults often progressively worsen, and it is not until the mechanical faults are well developed that the diagnosis can be made with certainty. Early detection of these machine faults would allow a significant limitation of the quantities of faulty material made in the period before the machine fault becomes so bad that a reliable diagnosis can be made. Furthermore, with advanced knowledge of a developing machine fault, maintenance could be scheduled at a convenient time and unnecessary component changes could be eliminated.

In recent years, various systems for measuring the textile product entering or leaving the drafting or draw zones have entered commercial use. The linear density of the strand is sometimes measured continuously with a view to directly correcting the deviation from the set level by controlling the relative speeds of the various roll sets. In textile technology, this use is referred to as "autolevelling". Alternatively, the data are used for supervisory purposes, in which case the data are usually stored, displayed and/or manipulated by a computer. The latter is referred to as "monitoring". In monitoring, one purpose is to detect mechanically induced errors, and to have the corrections made with the shortest time lag possible. It is also desirable to correct errors in the other category, but it is more difficult to diagnose errors with large random components in which the source of the error may not lay in the subject machine. It is even more difficult to effect a solution to the problems in this category. On the other hand, when mechanical errors are correctly diagnosed, it is an easy matter to effect a solution, but the delay in diagnosis is still a problem. Thus, practical management of a mill or production unit requires that the sources of mechanically induced errors be promptly identified and eliminated. The mechanical imperfections include: (1) eccentricities of the rolls or other rotating elements of the machine which produce a sinusoidal variation in linear density of the strand at the fundamental frequency of the faulty machine element, (2) out-of-round elements which produce fundamental frequencies and various harmonics according to the actual shape of the faulty element, (3) variations in roller hardness (particularly when the roll has a soft covering), which also produces fundamental and harmonic frequencies.

As will be shown later, although mechanical errors might be perfectly repetitive at the point of production, they do not remain so. Drafting waves acting on a strand which has repetitive errors cause a dispersion of the particular error wavelengths associated with the mechanical error source. This is not to say that the error is reduced, but merely that the error is dispersed over a range of frequencies (or wavelengths). In the existing art, experts analyzing the test data from a sample of faulty strand of material removed from the machine usually employ a form of harmonic analysis in which the data is expressed in the frequency domain where error amplitude is the ordinate and error frequency (or wavelength) is the abscissa of the graph on which the results are displayed. Additionally, it is known in the art to make measurements on the strand emerging from the drafting or drawing system in real time, but these measurements purport to yield data relating to the variations in the linear density of the material, and expert analysis of these data is needed to diagnose a faulty machine component. As elsewhere described, signals from such measuring means known to the art at the point described will contain random errors, quasi-random errors, and dispersed harmonic errors.

An eccentric roll should produce a "spike" at a wavelength equal to the circumference of the faulty roll when the error is measured immediately adjacent to the faulty roll. If the error is measured after the strand has been drafted in a system which produces a drafting wave, then the error as seen in the frequency domain will appear as a rounded hill. The more the dispersion, the more rounded the hill and the lower is the height of the crest of the hill. In normal processing, not only is there drafting between the sets of rolls as previously described, but also there is frequently an uncontrolled drafting during the transport of the strand from the delivery rolls to the take-up unit in which the strand is stored. In monitoring systems known to the art, the strand is sometimes monitored after such uncontrolled drafting has taken place. It therefore follows that the strand actually measured commonly has a degree of dispersion of the tell-tale spike which signifies to the expert that a mechanical error is present. The drafting wave activity is always considerable, and it becomes very difficult to discriminate between the rounded low profile of a dispersed and initially small mechanical error, and the profile of the diagram representing the drafting waves which contain an irregular spectrum of frequencies. It is known to the art to measure the material in real time as it approaches the drafting system, but this cannot predict mechanical errors which follow.

It is accordingly an object of this invention to provide a method and apparatus for the early detection of mechanical imperfections of the described type in a roller drafting system.

It is a further object of this invention to provide a method and apparatus for detecting mechanical imperfections in a roller drafting system and wherein the imperfections can be detected while the machine is in operation, i.e., in real time, and without significant dispersion of the error signal.

It is yet another object of this invention to provide a method and apparatus for detecting mechanical imperfections in a roller drafting system, and wherein the detected imperfections can be associated with the source of imperfection, and so as to enable the operator or manager to obtain an early warning of the deterioration or impending failure of a rotating element of the machine.

SUMMARY OF THE INVENTION

These and other objects and advantages of the present invention are accomplished by a method and apparatus of detecting the presence of mechanical roll imperfections in a drafting or drawing apparatus and which comprises the steps of monitoring the separation between the rolls of at least one pair of cooperating rolls within a set caused by the material passing therethrough, generating a signal representative of the separation between said one pair of rolls, processing the signal so as to identify harmonic components thereof, and correlating the processed signal with the rotational frequencies of the rotating mechanical components of the drafting or drawing apparatus. A synchronism which is found between harmonic components and a rotational frequency is indicative of a mechanical imperfection in the associated mechanical component. The above described process can be carried out while the apparatus is operating, thereby facilitating the early detection of an mechanical imperfection. Such early detection can reduce the quantity of faulty material produced by the machine and can avoid the change of costly machine components until they are needed.

BRIEF DESCRIPTION OF THE DRAWINGS

Some of the objects and advantages of the present invention having been stated, others will be more fully understood from the detailed description which follows and by reference to the accompanying drawings in which:

FIG. 14 also illustrates a typical class interval for synchronous operation, e.g. all errors in the class interval between angles A and B will be accumulated within the class interval A-B, and in no other class interval. The illustrated peak value is the maximum statistical frequency in any class interval, and the average value is the average statistical value over all class intervals.

DETAILED DESCRIPTION OF THE PREFERRED EMBODIMENT

Figure 1:
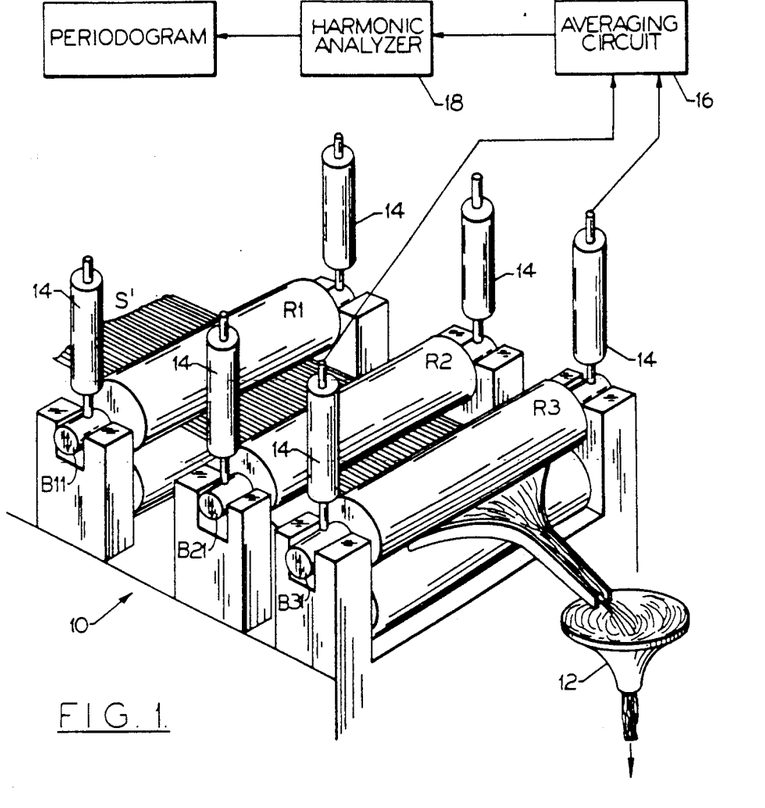
FIG. 1 is a schematic perspective view of a textile draw frame showing linear variable differential transformers applied to each set of rolls in accordance with the present invention.

Referring more particularly to the drawings, FIG. 1 schematically illustrates a draw frame 10 which comprises three sets of draw rolls, namely a rear set R1, a middle set R2, and a front set R3. The rolls of each set are pressed together by conventional means to grip the textile strand S passing through the draw frame, and the rolls of each set rotate at the same surface velocity. Also, the increases in rotational speed of the rolls in each successive set in the flow direction impart the desired draft to the strand. Upon leaving the sets of rollers, the strand passes through a condensing trumpet 12.

In accordance with the present invention, provision is made by which the separation of the rolls of each set can be continuously monitored. More particularly, in the illustrated embodiment, linear variable differential transformers (LVDTs) 14 of conventional design are clamped to the frame of the subject machine with their movable armatures in contact with the shaft or bearings at one or both ends of the top roll of each set so that the LVDTs are able to sense the vertical or nearly vertical movement of the top rolls of each set with great accuracy. In the cases where the top rolls do not float, then the LVDTs would be applied to the floating rolls, but for the present purpose the term "top roll" shall be construed as also meaning any roll which is permitted to move in a direction roughly perpendicular to its axis to accommodate variable thicknesses of material passing through the set of cooperating rolls.

Figure 2:
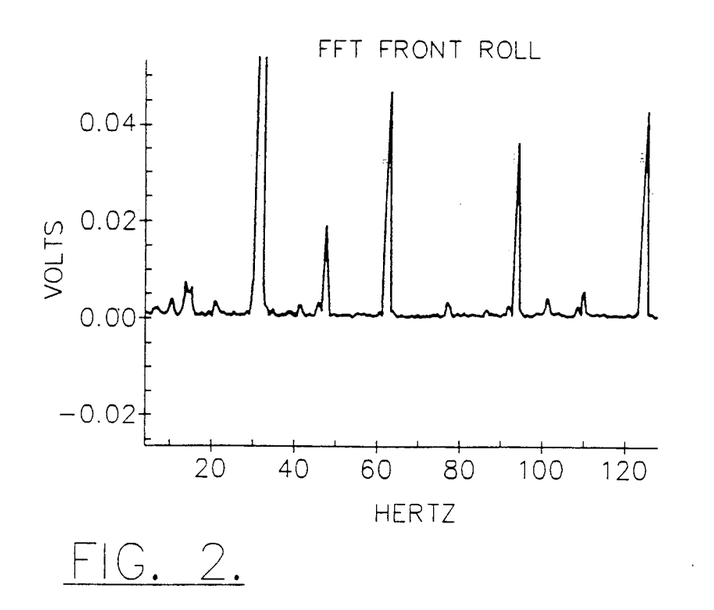
FIG. 2 is a graphic representation of a periodogram for a front roll set of a draw frame showing a strong harmonic frequency corresponding to a mechanical roll imperfection fR, the second harmonic of the fundamental ($2 \times fR$) and the third harmonic ($3 \times fR$)

The two LVDTs associated with each top roll each provide an electrical or other signal representative of the separation between the associated top and bottom rolls. As indicated schematically in FIG. 1 for the front rolls, these two signals for each roll set are preferably averaged in a conventional averaging circuit 16, and the average signal is fed to a harmonic analyzer 18 which serves to separate the signal into a number of component frequencies. Also, the analyzer converts the signal from amplitude versus time, to amplitude versus frequency. The result is a plot such as shown in FIG. 2, which is referred to as a periodogram, and which displays any discrete repeating frequencies of signal variation. The data is then said to be in the frequency domain. Harmonic analyzers capable of performing the above functions are conventional and well known to those skilled in the art.

The detected discrete frequencies are then correlated with the rotational frequencies of the rotating mechanical components (e.g. the drafting rolls) of the drafting apparatus, and any synchronism between the detected frequency and a rotational frequency will be indicative of a mechanical imperfection in the associated mechanical component.

If one or more of the rolls in a set are faulty, at least one of the mounting shafts will be forced to oscillate in such a way that the center-to-center distance between the rolls in the set varies to accommodate the error. Errors in the material passing through the rolls will also cause movement although in the latter case the motion will have a random component and, perhaps, a quasi-harmonic motion in which the frequency changes according to the nature of the material (e.g. the population of fibers) passing through. Roll errors on the other hand produce a strictly harmonic pattern which can be related to the movement of rolls in a strict phase relationship. In a draw frame a given LVDT (or other apparatus) measuring the separation of the rolls in a set of rolls will measure both sorts of movement. It is necessary to compare the strictly harmonic signal with signals from each of the rolls in the set to see which one(s) is (are) generating the error. Thus, the device must be capable of separating the random and quasiharmonic signals from the strictly harmonic ones. Furthermore, the system must be capable of comparing the frequencies generated by the movement of the suspect roll and the signal from the LVDT or other measuring apparatus. This may be done by comparing the constancy of the phase relationship.

In accordance with the present invention, a phase discriminator is provided which will show when the error signal and any of the suspect rolls are in synchronism. The establishment of such synchronism indicates which roll is faulty even though the machine may still be running. A number of possibilities exist for the design of such a phase discriminator.

One possibility is to use the error signal to trigger a stroboscope (not shown) which is used to illuminate the rolls in the system. If the error signal is harmonic and in synchronism, the faulty roll is seen to stand still. If there are strong random components in the error signal there is a random component in the timing of the flashes and it may be difficult to recognize the harmonic phase angle relationships.

Figure 10:
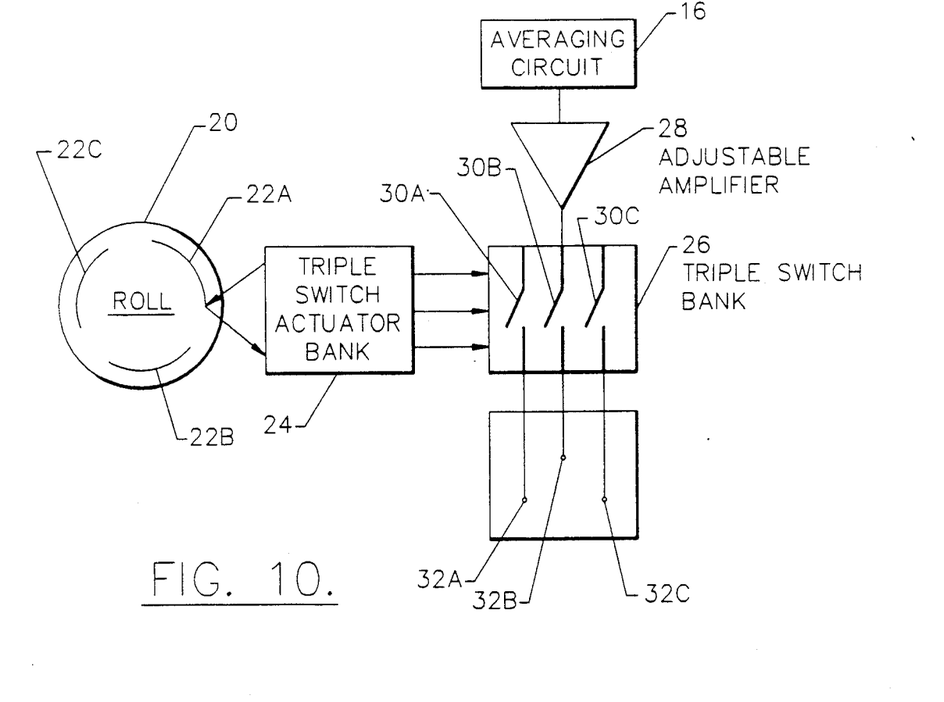
FIG. 10 is a schematic layout of a phase indicator for visually detecting mechanical roll imperfections and establishing any state of synchronism between the signals from roll separations and the movement of the rolls.

A simple form of filtering out the random component is to use the human eye to integrate the data and estimate whether or not the relative phase angle is fixed. One way to do this is illustrated in FIG. 10. In the illustrated embodiment, the suspect roll 20 mounts three reflector strips 22A, 22B, 22C, which extend for equal angular increments about the circumference of the roll or other rotating mechanical component of the apparatus. A triple switch actuator bank 24 is positioned adjacent the roll, with each switch of the bank 24 being aligned with one of the reflector strips and so as to be closed during a portion of the rotation during which the associated reflector strip is aligned with the switch. The signals from the switches are fed to a triple switch bank 26. The output from the roll separation measuring device such as the averaging circuit 16 is fed through an adjustable amplifier 28 to the bank 26, and so that the error signal is continuously applied to each of the three switches 30A, 30B, 30C. Each of the three switches operates a lamp 32A, 32B, 32C of the type that have a distinct ignition voltage. These lamps are placed in proximity, preferably in a circle, and in the same order as in the switching sequence.

The ignition voltage is set so as to light the lamps if the error is unacceptably high. On the other hand, the ignition voltage is set so as to cause the lamps to remain dark when the error is small. The level at which ignition occurs may be set according to need. Thus the presence of a set of lighted lamps gives warning of an unacceptably large error from the time the error exceeds the tolerance level.

Figure 11:
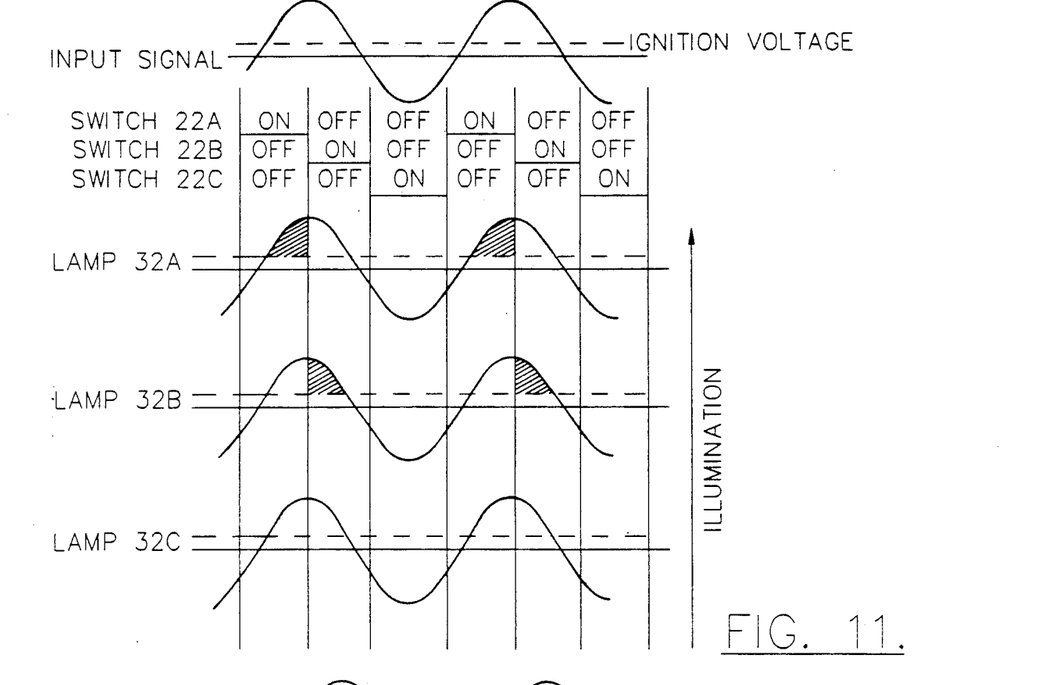
FIG. 11 shows a sinusoidal pattern of an input signal to the phase indicator and its relation to various switch positions activated by the moving rolls and the state of illumination of the three indicator lamps shown.
Figure 12:
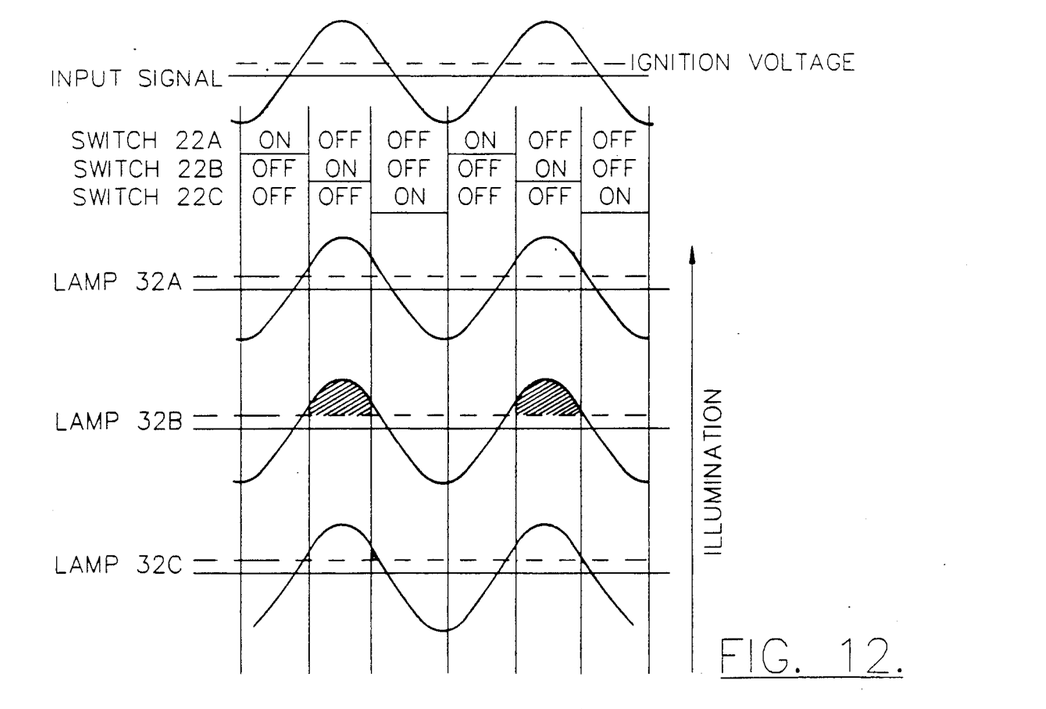
FIG. 12 shows a sinusoidal pattern of an input signal which has a different phase relationship of the position of the switch point as compared to that shown in FIG. 11, and which shows another pattern of illumination of the lamps.

If the error is harmonic, there is a voltage applied to the lamps which is sinusoidal, and the lamps are lighted only at certain periods within the switching cycle. If the voltage is sinusoidal but not at a frequency that matches the switching frequency, there is a pattern of illumination but the pattern rotates, perhaps so that that the eye cannot perceive the pattern. When the harmonic error is in synchronism with the faulty roll a standing pattern is seen with some lamps lit and others dark. FIG. 11 shows a three-phase version of this device. In this case, lamps 32A and 32B are lit and lamp 32C is dark and remains that way all the time the error signal and the faulty roll are locked in synchronism. If the angle at which the fault exists in the roll is as shown in FIG. 12, two lamps are black and only one is lit but the pattern is still fixed. A fixed pattern is always obtained no matter what the relative phase angle providing the angle is fixed. If error is random, the lights flicker, perhaps at frequencies undiscernable to the human eye, but no standing pattern appears.

If the error signal contains several frequencies only one of which is synchronous, there is a standing pattern plus rotating ones. If the rotating one(s) moves at speeds that the eye cannot follow, the contrast in the pattern is reduced, but the standing pattern remains. If the mixed harmonics are close to one another in frequency, slowly rotating and fixed patterns are superimposed. This latter set of circumstances might make it difficult to segregate the faulty roll. But under normal circumstances, the top and bottom rolls in a set are of different diameters and produce sufficiently different frequencies that this latter circumstance should present little problem. If the diameter of one of a pair of rolls is an exact multiple of the other, then two standing patterns are generated, and it is impossible to tell which is which, but this too is an unlikely event. In any case, the design of the machine can always be adjusted to make sure that similar or harmonic rotational frequencies are avoided.

If there is a mixture of random and synchronous harmonic components, the random flashes are integrated by the eye and distributed among the lamps; the pattern remains but has slightly less contrast because the "dark" lamp(s) become illuminated at a low level by random ignitions, and the "light" lamp(s) lose a little brightness.

Figure 7:
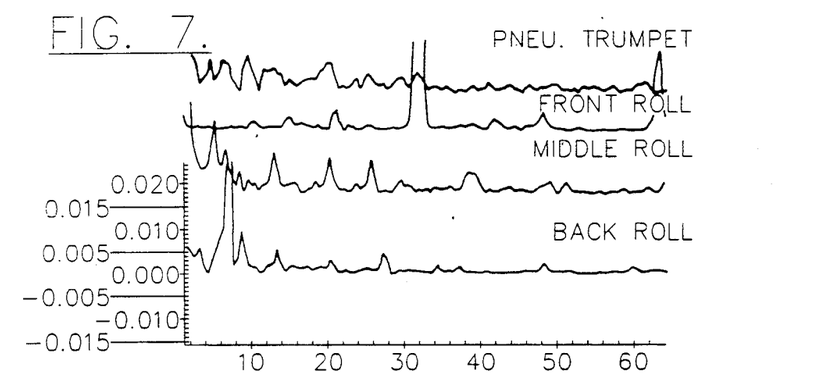
FIG. 7 is a set of periodograms taken from various places at the same time and superimposed on the same chart at various vertical positions so as to permit comparison, and which show the error measured at one position produces little effect at downstream measuring positions because of the aforementioned frequency dispersion effects.

When two passages of drawing are used, the error wavelength in the feed material produced by the first machine is sometimes of the same nominal wavelength as the error produced by the back roll of the second machine. Also, in the textile application of a draw frame, the sliver condenser produces a considerable frequency dispersion as shown in FIG. 7, and therefore, the sliver produced by the first machine contains a spectrum of frequencies rather than a single one. Hence, such sliver passing through the back roll is unlikely to produce a well defined pattern of illumination in the indicator. Furthermore, there is likely to be some difference in frequency, and exact synchronism will occur only with the rolls in the set being measured.

Another way to achieve the same object is to have interrupters fitted to the rolls or shafts rotating in synchronism with the rolls. The interrupters allow beams from light sources activated by the error signals from the LVDTs, or equivalent, to pass only at specified positions of the roll. The intensity of the light source varies with the error amplitude, and no light is emitted until the error exceeds the tolerance level. In one example, disks rotating synchronously with the affected rolls each have three slots through which the light source can be viewed. In other words, the signal is chopped optically, and synchronism is displayed in the manner already described. For each of viewing, fiber optics may be used to bring the optical signals to a central zone and to arrange them in the correct order.

Figure 13:
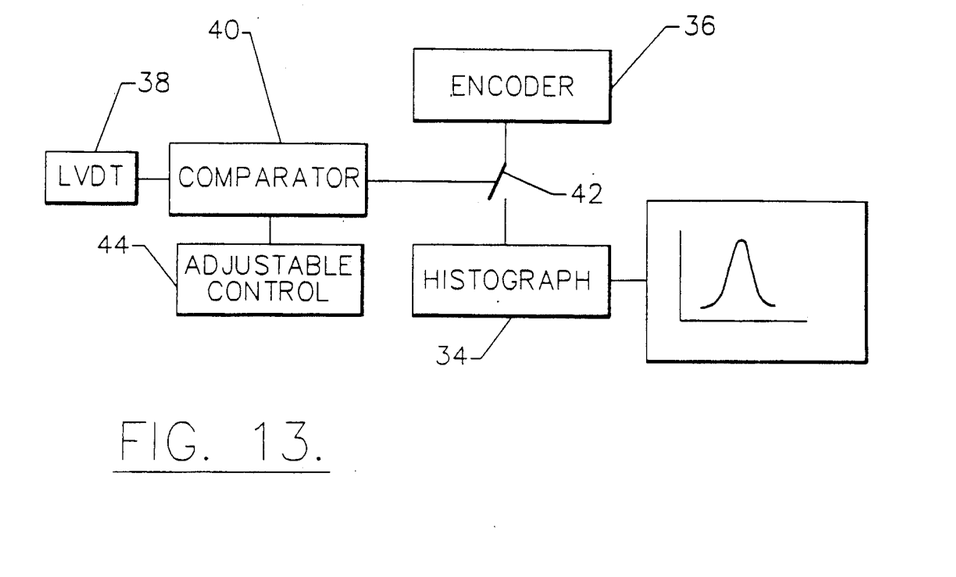
FIG. 13 is a schematic illustration of the present invention in association with a roll pair having absolute encoders connected to the said rolls, roll separation measuring means, and a histograph in which the signal from the roll separation measuring means is compared to a preset level, and when it exceeds that level, it transmits the digital codes from the encoder to the histograph where the signals are sorted and a histogram showing the statistical frequency of occurrence in a set time interval of each of the codes in the encoder, such histogram having the property of being able to separate harmonic and random components.

As still another embodiment, statistical renditions may be applied to correlate the detected discrete frequencies with the rotational frequencies of the rolls. In this embodiment, it is proposed to use a histogram as shown in FIG. 13 at 34, which is defined as an apparatus capable of sorting data with class intervals and indicating the statistical frequency in each class interval. In the case where the data is distributed randomly across all of the class intervals, then assuming a sufficiency of data is acquired, all class intervals will have the same statistical frequency. For this purpose, statistical frequency means the number of data points which occur within a class interval. In the case where there is a harmonic variation which is strictly correlated to the description of the class intervals, only certain of those intervals will show a high statistical frequency. For example, if the class intervals are in terms of the angular position of the suspect roll, and the separation of the shafts is a simple harmonic motion, and only the excursions beyond a given set point are recorded, then only a band of adjacent channels will have a finite statistical frequency, the others will show no statistical frequency.

Figure 17:
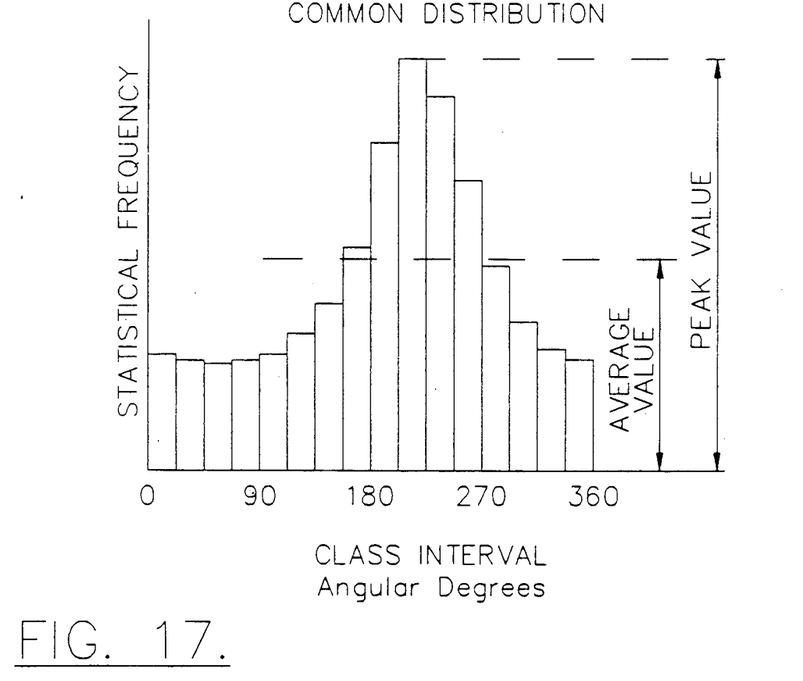
FIG. 17 shows a histogram from the apparatus shown in FIG. 13 for the case where there is a mixture of mechanical errors arising from the associated faulty roll and other errors of the various types described in FIGS. 15 and 16.

In practice, the distribution of statistical frequency for the case where there is correlation between the error signal and the angular position of the roll over a sufficient period of time, will be as illustrated in FIG. 17. In such a distribution, there will be a class interval which has a maximum statistical frequency. By the very nature of such a diagram, the above described peak must be numerically greater than the average value of all the intervals. In other words, the peak to average ratio will be greater than one. This is a useful indicator of the synchronism between the signal from the roll separation measuring means and the rotation of the suspect shaft.

In the embodiment of FIG. 13, the suspect roll is directly coupled to an absolute encoder 36 which comprises a plurality of segments and, as is known in the art, as each segment passes a datum point, it delivers a unique signal. The signal from the LVDT, or equivalent device 38, is passed through a comparator 40, which allows the signals to pass to the switch 42 only when the signal exceeds a set value determined by the adjustable control 44. The switch 42 thus permits the signal from the encoder 36 to be connected to the histograph 34 only when the signal from the measuring device 38 departs more than a set value from the average. The histograph would thus only receive signals when, for example, the oscillation of the separation exceeds x% of the average value of the absolute separation as determined over a period of y seconds. The output of the histograph would give a statistical distribution of data gathered over a period of z seconds which may overlap with the period y or might follow it after an interval varying from zero to w seconds. The values to x, y, and z will be determined for the best operation of the device.

Figure 14:
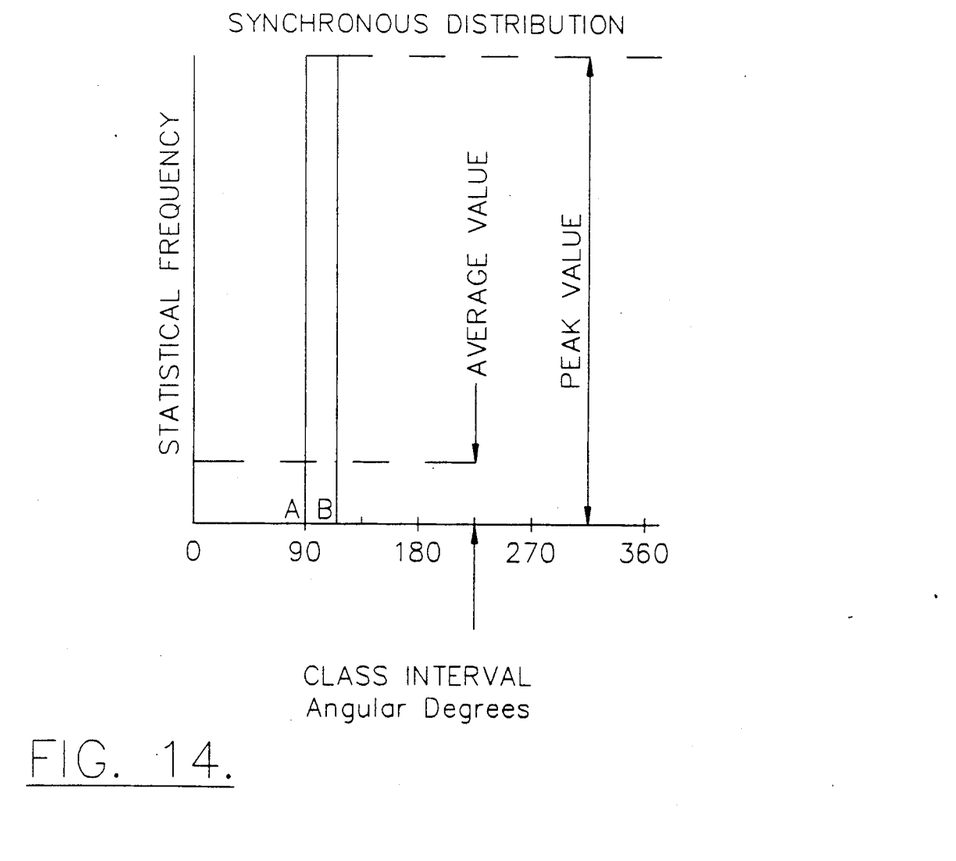
FIG. 14 shows a histogram from the apparatus shown in FIG. 13 for an ideal case where there is a single discrete mechanical error which is the sole disturbing factor and that error is caused by the roll to which the encoder is attached.
Figure 15:
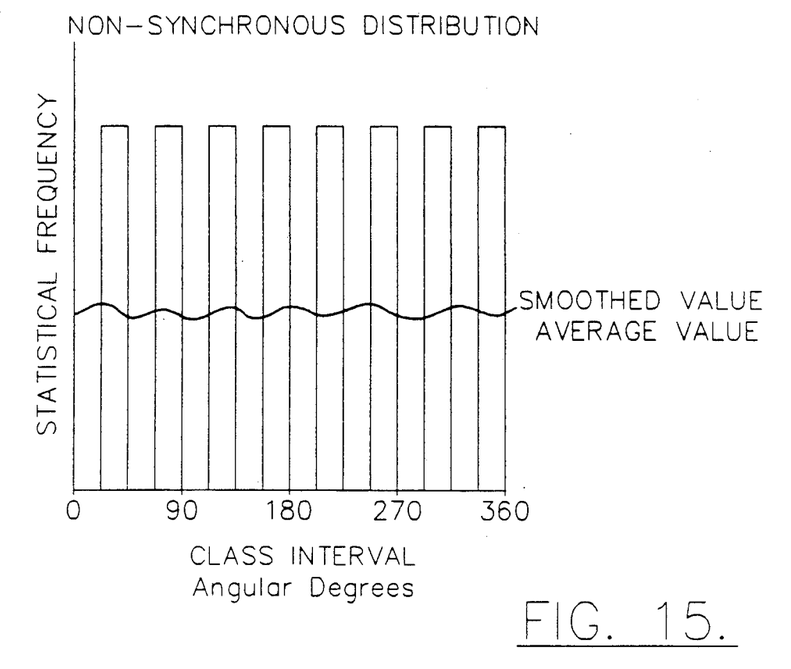
FIG. 15 shows a histogram from the apparatus shown in FIG. 13 for the case where there is a single discrete mechanical error, but it is not synchronized with the roll to which the encoder is attached. At each revolution of the subject shaft a signal will be generated within a different class interval, and when these are accumulated and smoothed over n class intervals, which is a smaller number than the total number m of class intervals in 360°, then the average value will be as shown and will vary but little over the whole range of class intervals.
Figure 16:
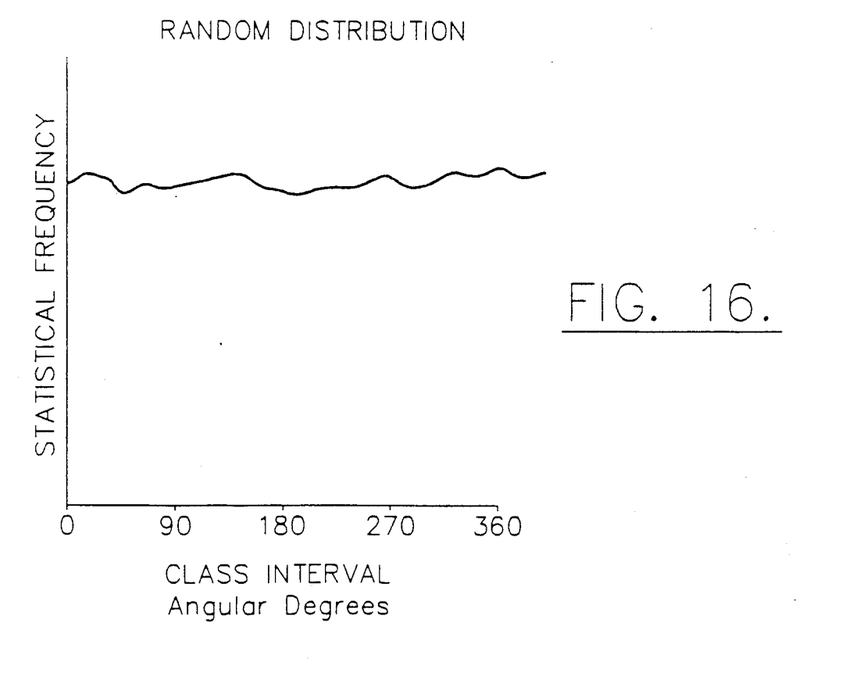
FIG. 16 shows a histogram from the apparatus shown in FIG. 13 for the case where the signal from the roll separation measuring means is random or has a large random component and no part of the signal is synchronized with the movement of the roll to which the encoder is attached.

If the signal is random and y and z are sufficiently large, all intervals will have the same statistical frequency. The peak to average value on the output from the histograph will be 1.0 as shown in FIG. 16. If the signals are both harmonic but of different frequencies and y and z are sufficiently long, the peak to average value will also be 1.0 as shown in FIG. 15. If, however, there is solely strictly a harmonic component in the signal which is generated by the subject roll, peak to average value is greater than 1.0 as shown in FIG. 14. In a practical case where there is a mixture, the aforesaid causes a distribution curve similar to that shown in FIG. 17 to be generated, and the peak to average ratio will still be greater than 1.0. When the peak to average value reaches a set value (which is greater than 1.0), the alarm, or record, will be transmitted to the monitoring system.

EXPERIMENTAL WORK

The following experiments were carried out on an Ingolstadt model RSB 31 drawframe with a three over four drafting arrangement, such as used in the textile industry. The linear variable differential transformers were placed in contact with the tappets of the loading springs in contact with the top roll necks. Vertical movement of the top rolls could thus be measured with great accuracy even when the machine was running. Any eccentricity or out-of-roundness of either top or bottom roll could be detected. Variations in the thickness of the strand being drafted could also be detected. Whereas prior monitoring systems which directly measure the sliver tend to be dominated by fiber variations and short wavelength noise, the results from the LVDTs were dominated by the mechanical errors. Six LVDTs were mounted as in FIG. 1, one above each loading spring (two LVDTs for each top roll), and the signals were analyzed with a Data 6000 harmonic wave analyzer, manufactured by Data Precision, Inc. of Danvers, Massachusetts. Provision was also made concurrently to measure the pressure at the slivertrumpet throat and the movement of the tongue-and-groove autoleveller system in the feed to the frame. However, for many measurements, the autolevelling equipment was uncoupled to prevent variation in speeds caused by its normal operation. In addition, normal laboratory tests were made on the slivers produced.

TEST RESULTS

Initial tests were made with 7, 6, 5, 4, or 3 slivers in the feed but the LVDT alternating current outputs varied little in consequence. Drafting wave activity could be seen, but it was not predominant nor in the same waveband as most of the signal from the eccentric rolls. A periodogram derived from the front top roller using the FFT transform function on the Data 6000 analyzer is shown in FIG. 2, and it will be noted that there were discrete frequencies which appear to be the only major signals, but in fact there were faint signs of drafting wave activity when the data was examined very closely. The frequencies observed were 32 Hz (which corresponds to the frequency of rotation of the top front roll), 48 Hz (which corresponds to the rotational speed of the bottom front roll), and their harmonics. The strength of the harmonics from the top roll (64 Hz, 96 Hz and 128 Hz) suggests that the rubber had become flattened, probably because the pressure had been left on at some time. Measurement of the rolls revealed that the eccentricities were as given in Table 1.

TABLE 1

Eccentricities of the rollers in the Draw Frame
All measurements in inches

| Roller | Left side | Right side |
| --- | --- | --- |
| Front top | 0.0040 | 0.0030 |
| Middle top | 0.0015 | 0.0015 |
| Back top | 0.0030 | 0.0020 |

Figure 3:
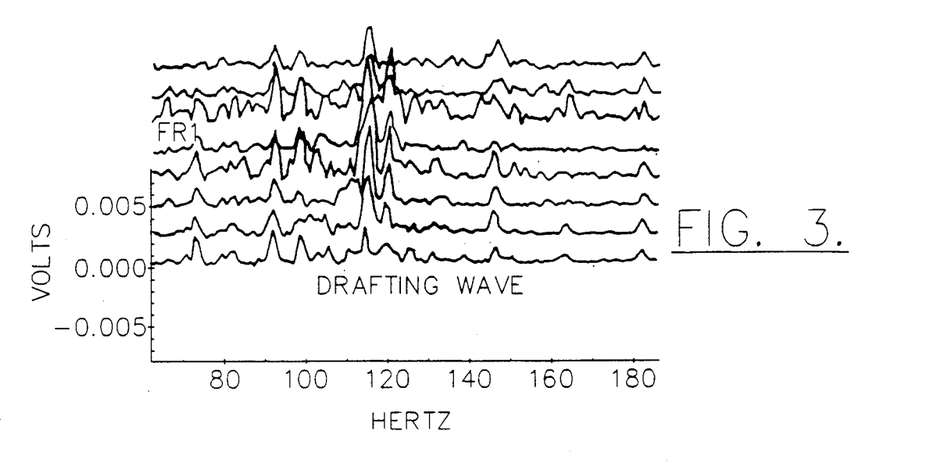
FIG. 3 is a set of periodograms of a similar front roll to that of FIG. 2 but where the mechanical roll imperfections are vanishingly small and the drafting wave activity is predominant even if the amplitude of error is much smaller than that shown in FIG. 2.

The top front roller was replaced by a concentric one, and periodograms such as shown in FIG. 3 were obtained. The range from 70 Hz to 180 Hz is shown which does not include the fundamental frequencies of either the top or bottom front roller. Furthermore, a different vertical scale was used to give a sensitivity of more than 2.5 times that used in FIG. 2. An array of periodograms is shown to demonstrate that there was no persistent frequency in the series such as would have been obtained had the error come from mechanical imperfections in the subject roll pair. The diagram shows that variations did exist although they occurred at low energy levels. There was an approximate repetition in the vicinity of 120 Hz, but experience teaches that this is typical of a drafting wave, and although it can sometimes be confused with a mechanical error (particularly with a single periodogram or spectrogram), its source is not a mechanical error.

Figure 4:
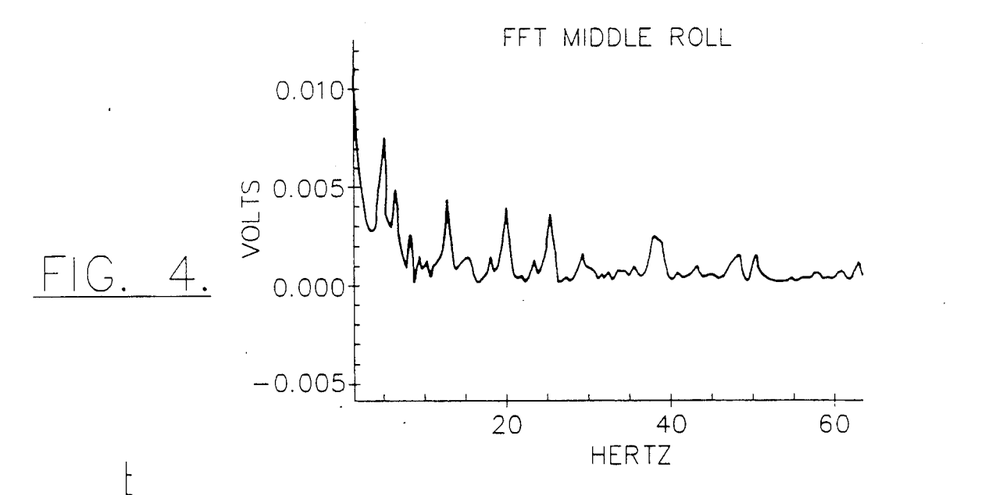
FIG. 4 is a periodogram from a middle set of rolls having two bottom rolls and one top roll, and showing distinct harmonics related to the movement of both bottom rolls.
Figure 5:
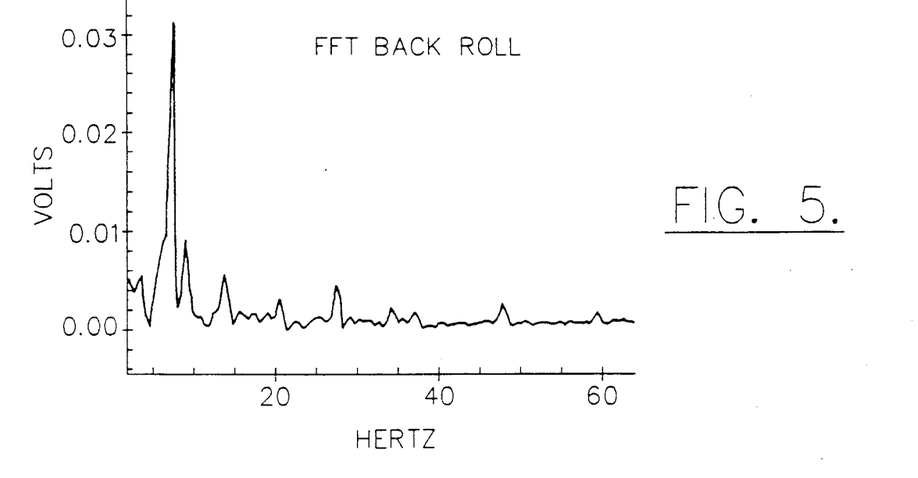
FIG. 5 is a periodogram of a set of back rolls showing a strong harmonic at a frequency associated with the top roll of the back set.

FIG. 4 shows data from the middle roller system in which three rolls operate, one top and two bottom rolls. The rotational frequencies of the rolls were 13 Hz for the large bottom roll, 21 Hz for the small bottom roll and 10 Hz for the top roll. It should be noted that the autoscaling feature of the Data 6000 has given a false zero in the X direction and the large incomplete peak at the left occurs at 2 Hz. There were also peaks at 5, 6.6, 7, 13, 21 and 26 Hz. The 13, and 21 Hz components were clearly the fundamentals of the two bottom rolls and 26 Hz was the second harmonic of the large bottom roll. It appears that both bottom rolls had been damaged at some time in the past. This frequently happens if there is a severe lap-up. The top roll did not appear to have generated a recognizable component and the two lower frequencies could not be associated with the particular roll set. However, it must be pointed out that the eccentricity of this particular top roll was only 0.001 inch compared to 0.004/0.003 inch at the front roll. FIG. 5 shows data for the back roller pair. The dominant frequency in this case was 7 Hz and a series of small harmonics also appeared. The top roller speed was 7 Hz and it may have been this frequency which was transmitted to the middle roll set to give a 7 Hz signal there.

Under normal operating conditions, each roll is assumed to produce its own characteristic harmonic frequency unaffected by drafting. Although the error wavelength varies with position along the fiber flow line, the error frequency should not because of the changing speed of sliver flow along this fiber flow line. Without drafting errors, the output error wavelength is $D \times E$, where D is the draft and E is the error wavelength of the input material. The frequency is the quotient of velocity/ (error wavelength). The input frequency is $V_{in}/E$, and the output frequency is $V_{out}/(D \times E)$, but $V_{out}$ is nominally equal to $(D \times V_{in})$ and the frequency remains unchanged. As discussed later, there are irregular changes in velocity and draft during the drafting process which would be expected to disperse the errors. Nevertheless, one might expect to see disturbances at the front position at or near the frequencies from the middle and back rollers, and at the middle position from the back roller. These were not observed at the front roll and one is driven to the conclusion that the effects of dispersion might be significant where the draft is high.

Figure 6:
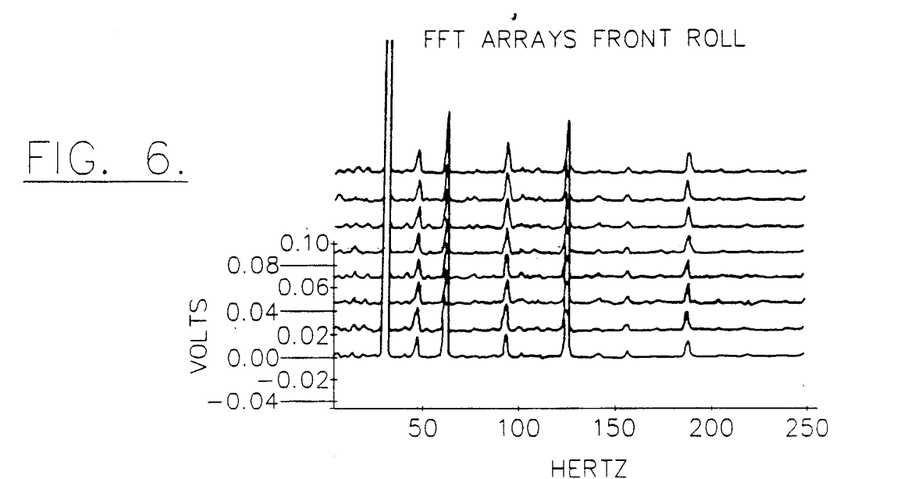
FIG. 6 is a set of periodograms from a front roll set in which several successive periodograms were taken and displayed at progressively higher positions on the chart, the repetition of the pattern of discrete frequencies indicating that the mechanical errors were dominant.

FIG. 6 shows an array of periodograms from the front roller position. It will be observed that the dominant discrete frequencies arose from the front roller set and there is sign of neither drafting waves nor mechanicals from the rollers upstream of the position. It is hypothesized that the drafting waves caused violent local variations in the draft which caused a dispersion of both the wavelength and frequency spectra of the incoming material. Undoubtedly the varying draft causes changes in elongation of the strand which shows up as changes in error wavelength. Since the material is constrained to a fixed velocity as it passes through a roll nip, the changes in wavelength are translated into changes in frequency at that point. Thus, it is assumed that a singular frequency at the input to a draft zone emerges as a spectrum of frequencies with some statistical distribution about the frequency of rotation of the faulty roller.

It was reasoned that if the major signal from the LVDTs was from the one roller set, then movements of the left and right roll necks should be highly correlated. The roller axis might not be parallel to the axis of rotation and there might be a whirling motion, in which case the amplitudes and phases might differ but the frequencies of motion should be the same. A test for this condition was made by using the cross-correlation function on the Data 6000 analyzer and the two sources were found to be highly correlated.

Figure 9:
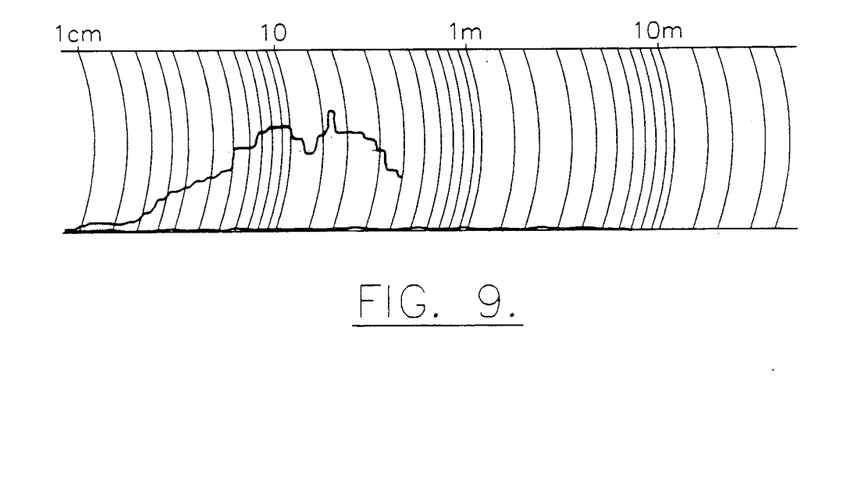
FIG. 9 is a spectrogram which is another form of displaying the data but where the abscissa is error wavelength rather than error frequency and which is a form commonly used in industry when the material is tested after manufacture has been completed, and the particular spectrogram was made by testing the material that had been manufactured while the foregoing discussed periodograms had been produced, and which shows no strong harmonic component.

Concurrent tests showed that the error frequencies produced in one roller set did not appear with any significant amplitude at downstream positions as shown in FIG. 7. The pneumatic trumpet scarcely showed a disturbance at the principal frequency detected at the front rollers with the LVDTs despite the apparent lack of draft between the two points. Uster tests of the sliver gave spectrograms (FIG. 9) in which peaks were observed at a wavelength corresponding to the frequency concerned but the amplitude were very small. Changes in the design of the condenser gave inconclusive results but running sliver at jogging speed and then testing it produced significantly higher peaks at the relevant wavelength in the spectrogram. It is believed that this indicates involuntary and irregular drafting in the sliver condenser, and it is speculated that this might be due to the abrupt changes in direction suffered by the sliver in the T-shaped condensers used in modern draw frames.

Figure 8:
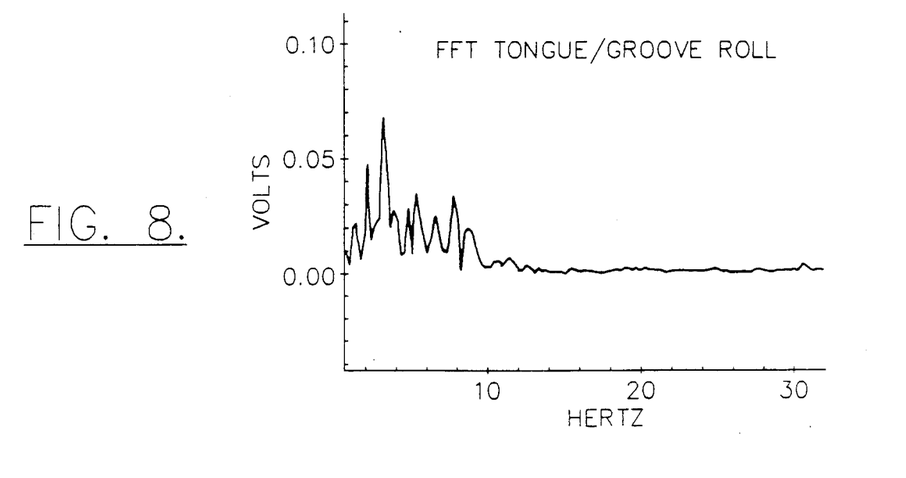
FIG. 8 is a periodogram from a tongue and groove roller normally used to measure linear density of the input strand for the purpose of autolevelling (which was not connected in the experiments from which the various periodograms herein given were obtained), and which shows a periodogram unrelated to the others shown in the previous figures.

The foregoing data was accumulated with the autoleveller disconnected so that the back roll speeds could be maintained at constant speeds. When the autoleveller was coupled, a diagram as shown in FIG. 8 was produced. A band of low frequencies from zero to about 8 Hz was observed. The frequency of rotation of the tongue and groove rollers were both at 3.5 Hz. The most prominent frequency detected was about 3 Hz. There was some evidence that a similar component appeared the back and middle rollers. It might be mentioned that there is no significant draft between the autoleveller and the back rollers and the draft between the back and middle rollers was only 1.3. Thus, it would be expected that there would be little drafting-wave error or frequency dispersion produced in these regions and that the variations would come from changes in the mass of sliver supplied. Thus, components of the upstream disturbances might be present in the signal measured at the middle and back roll sets. However, the main effects still came from faulty rolls at the positions cited. Under normal running conditions, the autoleveller is connected and the middle and back roll speeds change within a fairly narrow band to permit the appropriate draft changes. Hence, the frequencies produced by the LVDTs change accordingly. Thus, it was necessary to uncouple the autoleveller or find some means of correlation to be sure of the source of error when the autoleveller was connected. The former route was chosen for the experiments, but if the system were ever used commercially to determine the source of mechanical error, it would be necessary to develop a satisfactory correlation device as the present invention seeks to do.

In the drawings and specification, there have been set forth preferred embodiments of the invention, and although specific terms are employed, they are used in a generic and descriptive sense only and not for purposes of limitation.

That which is claimed is:

1. A method of detecting the presence of mechanical imperfections in rotating mechanical components of a drafting apparatus which comprises at least two sets of cooperating drafting rolls, with the sets of drafting rolls being operated at different surface speeds so as to draft material passing therethrough, and comprising the steps of;

guiding an advancing strand of material through the sets of rolls, and while permitting at least one pair of rolls of at least one set to be separated by the thickness of the advancing strand of material passing therethrough, monitoring the separation between the rolls of said one pair of cooperating rolls caused by the advancing strand of material passing therethrough, generating a signal representative of the separation between said one pair of cooperating rolls, processing the generated signal so as to identify harmonic components thereof, and correlating the processed signal with the rotational frequencies of selected ones of the rotating mechanical components of the drafting apparatus, and whereby synchronism between harmonic components of the processed signal and the rotational frequency of a selected one of the rotating mechanical components is indicative of a mechanical imperfection in the selected mechanical component.

2. The method as defined in claim 1 wherein the step of processing the generated signal includes controlling the signal so that no signal is transmitted while the level of the generated signal is within preset tolerance limits, and a signal is transmitted when the level of the generated signal is outside the preset tolerance limits.

3. The method as defined in claim 2 wherein the step of monitoring the separation between the rolls includes monitoring the separation at each end of said one pair of cooperating rolls, and the step of generating a signal includes averaging signals from the two ends to give a mean value of the two signals.

4. The method as defined in claim 1 wherein the generating step includes converting the signal to one in the frequency domain so that frequency spectra of said signal can be observed to assist identification of mechanical error.

5. The method as defined in claim 4 wherein the correlating step includes displaying amplitude versus harmonic frequency data in a form of a periodogram to indicate whether harmonic structure of the processed signal includes a fundamental, and odd or even harmonics by visual inspection so as to facilitate assessment of a type of developing imperfection in the rotating components of the drafting apparatus.

6. The method as defined in claim 1 wherein the correlating step includes triggering a stroboscope whenever the processed signal exceeds a preselected level and so as to illuminate the rotating components of the drafting apparatus, and visually monitoring for synchronism between major repetitive illumination pulses and the movement of the rotating components.

7. The method as defined in claim 1 wherein the correlation step includes:

providing a plurality of switches with a separate indicator connected to each switch, transmitting the processed signal to each of said switches, generating a series of on/off commands that are solely dependent on an angular position of one of said rotating components of the drafting apparatus and wherein each command is associated with a particular segment of said one rotating component and will give an "on" command when a front of said segment reaches a selected position and an "off" command when a trailing edge of the segment leaves the selected position, and applying said on/off commands to said switches in a sequence so that each of said indicators shall be activated when the processed signal exceeds a predetermined tolerance level at the time the associated segment of the rotating component is passing said selected position.

8. The method as defined in claim 7 wherein the correlation step further includes amplifying the processed signal before it is transmitted to said plurality of switches.

9. The method as defined in claim 1 wherein the correlating step includes:

generating individual signals at successive angular increments of the rotational movement of one of said rotating components such that each said individual signals uniquely describes one angular segment of the rotating component, passing the generated individual signals through a switch leading to a signal processor, applying the processed signal representing the separation between said one pair of cooperating rolls to the switch so as to close the switch when such signal exceeds a predetermined level, and processing the generated individual signals received through the switch so as to store a statistical frequency of those signals representative of the separation of the rolls which exceed the predetermined level for each angular position of the rolls, over a predetermined time period.

10. The method as defined in claim 9 wherein the step of processing the generated individual signals received through the switch includes graphically displaying the statistical frequency of the signals representative of the separation of the cooperating rolls which fall outside the predetermined tolerance level versus angular position of the rolls, over a predetermined time period.

11. The method as defined in claim 1 wherein the correlating step includes:

determining a series of class intervals defined by an angular position of a particular rotating mechanical component of the apparatus, determining the number of data points for each class interval so as to determine a statistical frequency for each class, with the data points being defined as instances where the signal representative of the separation between said one pair of cooperating rolls exceeds a predetermined value, and determining the ratio of the peak statistical frequency of data points to the average statistical frequency overall class intervals, wherein a value of said ratio significantly above unity is indicative of the synchronism associated with mechanical defects in said particular rotating component of the apparatus.

12. The method as defined in claim 11 wherein additionally the class intervals in which the statistical frequency ratio exceeds a preset value greater than unity are identified, the angular position of these intervals being indicative of the angular position of the defect in the rotating components of the said apparatus.

13. An apparatus for drafting an advancing strand of material, comprising:
- a plurality of rotating mechanical components including at least two sets of cooperating drafting rolls,
- means for guiding an advancing strand of material serially through the sets of rolls,
- means mounting at least one pair of cooperating rolls of at least one of said sets so as to permit the separation between said one pair of rolls to vary, and including means for biasing said one pair of rolls toward each other to grip the advancing strand of material, and such that the thickness of the advancing strand of material causes said one pair of rolls to separate,
- means for rotating the rolls within at least one of said sets at a different surface velocity from that of other sets so as to draft the material passing therethrough,
- means for monitoring the separation between said one pair of cooperating rolls,
- means for generating a signal representative of the separation between said one pair of cooperating rolls,
- means for processing the generated signal so as to identify harmonic components thereof, and
- means for correlating the processed signal with rotational frequencies of selected ones of the rotating mechanical components, and whereby synchronism between harmonic components of the processed signal and a rotational frequency is indicative of a mechanical imperfection in the associated mechanical component.

14. The apparatus as defined in claim 13 wherein said processing means includes means for controlling the generated signal so that no signal is transmitted while the level is within preset tolerance limits, and a signal is transmitted when the level of the generated signal is outside the preset tolerance limits.

15. The apparatus as defined in claim 13 wherein said one pair of cooperating rolls comprises a top roll and a bottom roll, and wherein the means for monitoring the separation between said one pair of cooperating rolls includes means for monitoring the separation at each end of said top roll, and for averaging the signals obtained at each of said ends.

16. The apparatus as defined in claim 13 wherein the correlating means comprises:
- a plurality of switches, and an indicator connected to each of said switches,
- means for transmitting the processed signal to each of said switches,
- means for generating a series of on/off commands that are solely dependent on the angular position of one of said rotating components of the drafting apparatus and wherein each command is associated with a particular segment of said one rotating component and will give an "on" command when a front of said segment approaches a selected position and an "off" command when a trailing edge of the segment leaves the selected position, and
- means for applying said on/off commands to said switches in a sequence so that each of said indicators shall be activated in response to said processed signal exceeding a predetermined tolerance level at a time the associated segment of the rotating component is passing said selected position.

17. The apparatus as defined in claim 16 wherein said indicators are lamps which have predetermined time constants so as to provide rises and declines in illumination levels.

18. The apparatus as defined in claim 13 wherein the correlating means comprises:
- encoder means for generating individual signals at successive angular increments of rotational movement of one of said rotating components, signal processor means for allocating the signals from the encoder means to appropriate class intervals of the rotational movement and accumulating the signals over a preset period of time, and
- switch means for delivering the signals from said encoder means to said signal processor means only when the signal representative of the separation of the said one pair of cooperating rolls departs more than a set value from the average value of such signal.

19. The apparatus as defined in claim 18 wherein said signal processing means comprises means for illustrating statistical frequency of signals received versus the angular position, over a set period of time.

20. The apparatus as defined in claim 13 wherein said means for generating a signal representative of the separation of the rolls includes means for monitoring the movement at each end of said one pair of rolls and for producing a separate signal for each end, and means for averaging the separate signals.

21. The apparatus as defined in claim 20 further comprising means for separating the averaged separate signals into a number of component frequencies and for displaying the separated frequencies in an amplitude versus frequency format.

* * * * *